Patented Oct. 20, 1953

2,656,315

UNITED STATES PATENT OFFICE 2,656,315

LUBRICATING GREASES THICKENED WITH CALCIUM SILICATE

George W. Eckert, Glenham, N. Y., assignor to The Texas Company, New York, N. Y., a corporation of Delaware No Drawing. Application February 27, 1952, Serial No. 273,775

7 Claims. (Cl. 252—21)

The present invention relates to lubricating greases thickened with calcium silicate in finely divided form.

Recently lubricating greases have been prepared employing various finely divided inorganic solids such as certain finely ground natural clays, carbon black, silica and various metal oxides as thickening agents. Greases thus obtained have important advantages over the conventional soap thickened greases, particularly in their higher dropping points and resistance to oxidative deterioration. However, greases obtained with the inorganic thickening agents which have been employed heretofore have also possessed certain serious disadvantages such as a lack of working stability, and it has furthermore been difficult to obtain a grease of good texture and uniformity with these thickening agents without employing additional thickening and texture modifying agents.

I have now found that very superior lubricating greases having excellent texture and stability, in addition to high dropping points and other advantages of inorganic gel greases generally, are obtained by employing as a thickening agent a precipitated hydrated calcium silicate in finely divided form, suitably in the form of particles not larger than 100 millimicrons in diameter and preferably from about 5 to about 50 millimicrons in diameter. The lubricating greases of my invention thus comprise an oleaginous liquid vehicle and a calcium silicate of the character described above, either with or without additional thickening agents such as soaps. The amount of calcium silicate employed in a given grease depends chiefly upon the viscosity and other characteristics of the oleaginous liquid vehicle, upon the presence or absence of additional thickening agents, and upon the particle size of the silicate, the amount of silicate required increasing rapidly with increase in particle size within the grease-making range of particle sizes. In general, the amount of calcium silicate employed may range between about 5 per cent and about 45 per cent by weight of the lubricating composition.

Precipitated hydrated calcium silicates are obtained by a number of different reactions, such as, for example, the reaction of calcium chloride with sodium silicate in aqueous solution. The composition of the silicate, including both the proportion of calcium to silica and the amount of water of hydration present, varies widely according to the method of preparation employed. Suitable compounds of this character for use according to the present invention may be represented by the general formula

$$(CaO)_n(SiO_2)_m \cdot xH_2O$$

wherein $n$ and $m$ are integers from 1 to 10 and $x$ is an integer from 1 to 5.

The oleaginous liquid vehicle employed in these compositions may be suitably a mineral lubricating oil obtained by any of the conventional refining procedures, advantageously a refined mineral oil in the viscosity range of from about 200 to about 400 seconds (Saybolt Universal) at 100° F. Other oleaginous materials which may be used are vegetable oils such as corn oil, cottonseed oil, castor oil, etc., and animal oils such as lard oil, sperm oil, etc. For some purposes, various synthetic oils may be employed with particular advantage, such as for example polyalkylene glycols, various high molecular weight esters, silicone polymer oils, etc.

The lubricating greases of my invention are readily and conveniently prepared without the necessity for any special technique or equipment by simply mixing together the oleaginous liquid vehicle and the calcium silicate in suitable finely divided form, as discussed above. If desired, the grease may be produced by adding the silicate to the oil and milling the slurry thus produced, suitably in a mill of the type employed to grind paint pigments. This method may be employed particularly advantageously when the silicate has become agglomerated into lumps. The calcium silicate can also be precipitated in situ in all or a portion of the base oil and the mixture then dehydrated, according to a known procedure for producing inorganic gel greases. However, this latter method is less convenient and frequently difficult to employ because the gel tends to agglomerate during the dehydration process, so that it is regarded as a special advantage of my invention that my greases can be prepared without resorting to this method of preparation.

As an example of my invention, lubricating greases were prepared employing as the thickening agent a precipitated, finely divided calcium silicate which is sold commercially under the trade name of "Silene EF." This material had a particle size of about 35 millimicrons average diameter, a specific gravity of 2.1 and a refractive index of 1.472. It analyzed 18.5% CaO, 64% SiO$_2$ and had a loss on ignition of 16.5% indicating that it consisted principally of a hydrated calcium silicate of the formula CaSi$_3$O$_7$·3H$_2$O. Three different lubricating oils, inspection data of which are shown in the following table, were employed as the base oils. Lubricating oils Nos. 1 and 2 were moderately refined paraffinic distillate oils and lubricating oil No. 3 was di-(2-ethylhexyl) sebacate.

| Lubricating Oil No. | 1 | 2 | 3 |
|---|---|---|---|
| Gravity | 21.6 | 29.2 | 22.8 |
| Flash, COC, °F | 375 | 445 | 403 |
| Fire, COC, °F | 410 | 515 | 495 |
| SSU Viscosity at 100° F | 301 | 339.8 | |
| SSU Viscosity at 210° F | | 54.2 | 37.35 |
| Pour, ASTM, °F | −15 | −15 | below −65 |

Lubricating oil No. 1 was mixed with "Silene EF" in varying proportions, the mixing being carried out for fifteen minutes at room temperature in a laboratory beaker. With 10 per cent of the calcium silicate a liquid product was obtained, while with 20 and 30 per cent of the calcium silicate greases were obtained having dropping points in excess of 500° F., an N. L. G. I. No. 2 grade grease being obtained with 30 per cent of the calcium silicate. All of the products were of a smooth, uniform consistency and showed no separation upon standing.

N. L. G. I. No. 2 grade greases were then prepared from each of the above lubricating oils by mixing them with 30% by weight based on the weight of the composition of the calcium silicate, the mixing being carried out at room temperature for one hour in a small pestle stirred kettle. In each case a smooth buttery grease of excellent texture and stability was obtained. The following table gives the inspection tests of these greases, compared with those of a grease which was prepared in the same manner from lubricating oil No. 1, employing as the thickening agent 20% of a hydrated silica of about 25 millimicron particle size which is sold commercially under the trade name "Hi-Sil."

as for example $CaSiO_3 \cdot 2.34H_2O$, $Ca_3Si_2O_7 \cdot H_2O$, etc., may also be employed if desired. Also, in addition to the calcium silicate, the grease may contain additional thickening agents such as fatty acid soaps or other solid thickeners such as finely divided silica, carbon black, etc. For example, about 5–15 per cent of a calcium silicate of the character described above may be added very advantageously to a grease containing about 10 to 30 per cent of a sodium, calcium, aluminum, or mixed base soap of stearic acid or other long chain fatty acid or hydroxy fatty acid. A block grease, for example, is obtained by mixing about 10–15 per cent of this material with a grease containing about 20–25% of a sodium or mixed sodium-calcium soap in a heavy or residual type mineral lubricating oil.

Additives of the usual type employed in lubricating greases, such as oxidation inhibitors, corrosion inhibitors, tackiness agents, such as various high polymer materials, extreme pressure agents, fillers, etc., may also be present. As examples of particularly suitable corrosion or rust inhibitors may be mentioned metal salts of wax benzene sulfonates, metal salts of petroleum sulfonates, lauryl phosphate, sorbitol monooleate and glycerol monostearate. Suitable oxidation inhibitors include phenyl alpha-naphthylamine, diphenyl paraphenylene diamine, tetramethyl diamino diphenyl methane and bis (2-hydroxy-3-t-butyl-5-methylphenyl) methane.

With particular advantage, a surface-active agent, for example, a compound such as a quaternary ammonium salt of a fatty acid, a polyglycol ether, a metal alkyl sulfate or sulfonate, etc., may be employed in the greases of this invention in order to improve their water resistance and emulsification characteristics. The surface-active agent may be added in any suit-

| Grease No. | A | B | C | D |
|---|---|---|---|---|
| Lubricating Oil No. | 1 | 2 | 3 | 1 |
| Thickening agent | Ca Silicate | Ca Silicate | Ca Silicate | Silica |
| Appearance | Buttery, Uniform | Buttery, Uniform | Buttery, Uniform | Buttery, Sandy |
| Dropping point, °F | 500+ | 500+ | 500+ | 500+ |
| Penetration, ASTM, 77° F.: | | | | |
| Unworked | 272 | 295 | 225 | 239 |
| Worked | 292 | 284 | 288 | 303 |

The above table shows that very high dropping point greases having excellent texture and working stability were obtained employing precipitated calcium silicate as the thickening agent. These greases were surprisingly superior to a grease prepared from finely divided silica which has been the most generally satisfactory of the inorganic solids employed as grease thickening agents heretofore. The silica thickened grease was much inferior from the standpoint of uniformity of texture and softened to a much greater degree upon working than did the calcium silicate thickened grease prepared from the same lubricating oil base. Greases prepared from silica of larger particle size are of still less satisfactory texture and stability and require higher proportions of silica for thickening to a given consistency.

While the calcium silicate $CaSi_3O_7 \cdot 3H_2O$ was employed as the thickening agent in the above lubricating greases of my invention, it is to be understood that other precipitated hydrated calcium silicates having the empirical formula $(CaO)_n(SiO_2)_m \cdot xH_2O$ as discussed above, such able manner during the preparation of the grease. Preferably, the surface-active material is employed to treat the calcium silicate before the latter is combined with the oleaginous liquid vehicle.

Obviously many modifications and variations of the invention, as hereinbefore set forth, may be made without departing from the spirit and scope thereof and, therefore, only such limitations should be imposed as are indicated in the appended claims.

I claim:

1. A lubricating grease comprising an oleaginous liquid as the predominating constituent, and about 5 to 45 per cent by weight based on the weight of the grease of a precipitated hydrated calcium silicate having a particle size of not more than 100 millimicrons in diameter.

2. Claim 1 wherein the calcium silicate is represented by the formula $(CaO)_n(SiO_2)_m \cdot xH_2O$, wherein $n$ and $m$ are integers from 1 to 10 and $x$ is an integer from 1 to 5.

3. Claim 1 wherein the calcium silicate is chiefly $CaSi_3O_7 \cdot 3H_2O$.

4. Claim 1 wherein the lubricating grease is a milled product.

5. Claim 1 wherein the lubricating grease contains a metal soap of a fatty acid selected from the group consisting of a long chain fatty acid and a long chain hydroxy fatty acid.

6. Claim 1 wherein the oleaginous liquid is a mineral lubricating oil having a viscosity in the range of about 200 to about 400 seconds (Saybolt Universal) at 100° F.

7. A lubricating grease consisting essentially of a major proportion of a mineral lubricating oil, and about 20–40% by weight based on the weight of the grease of finely divided precipitated hydrated calcium silicate having a particle size in the range of about 5–100 millimicrons and which thickens the mineral lubricating oil to a grease consistency.

GEORGE W. ECKERT.

References Cited in the file of this patent

UNITED STATES PATENTS

| Number | Name | Date |
| --- | --- | --- |
| 2,513,680 | Shott et al. | July 4, 1950 |
| 2,607,735 | Sproule et al. | Aug. 19, 1952 |